March 13, 1956 A. I. MIHALAKIS 2,738,491
PROJECTED WARNING SIGNAL DEVICE FOR AIRPLANES
Filed Nov. 14, 1951 2 Sheets-Sheet 1
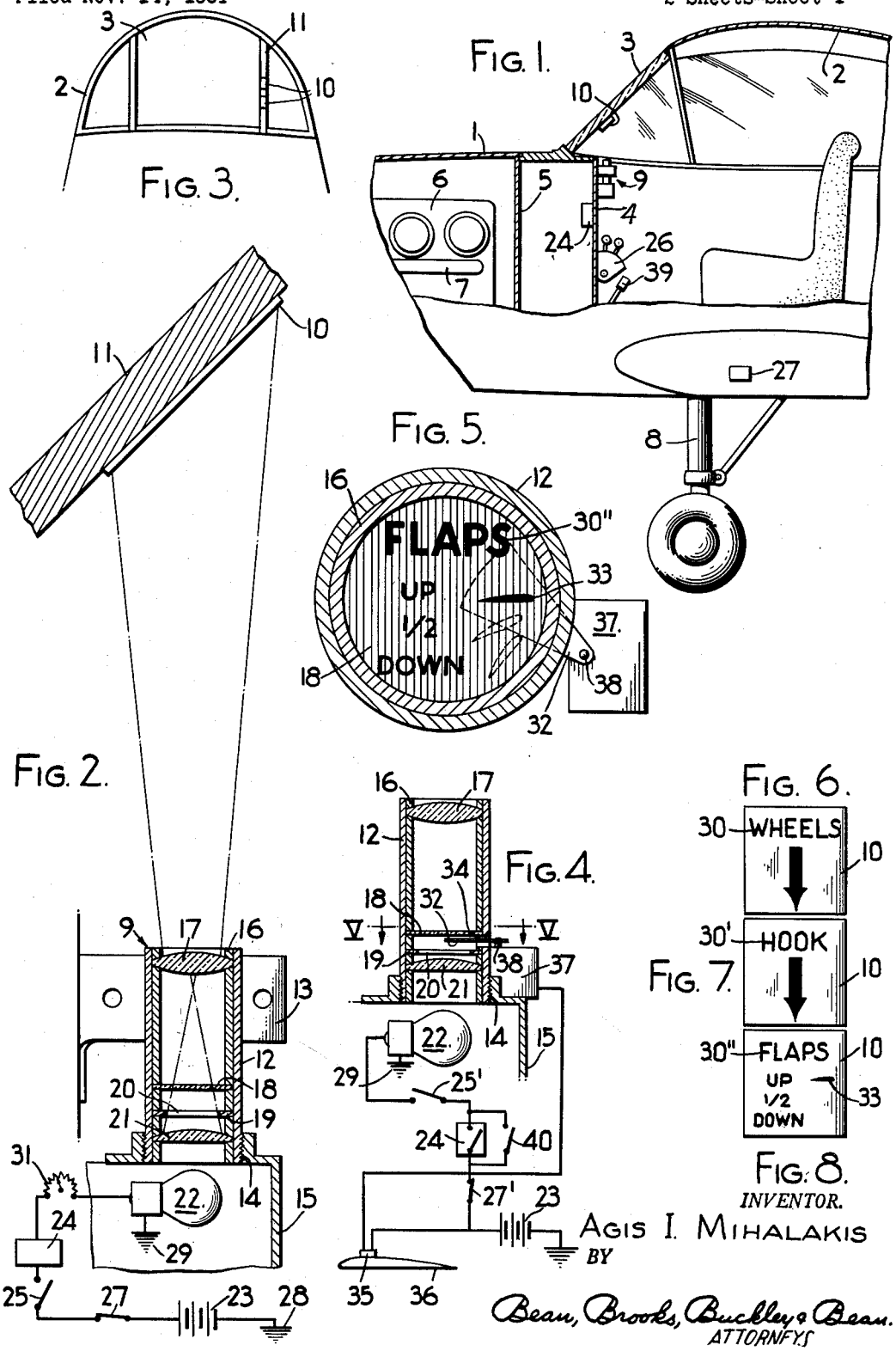
INVENTOR.
AGIS I. MIHALAKIS
BY
Bean, Brooks, Buckley & Bean.
ATTORNEYS March 13, 1956     A. I. MIHALAKIS     2,738,491
PROJECTED WARNING SIGNAL DEVICE FOR AIRPLANES
Filed Nov. 14, 1951     2 Sheets-Sheet 2

INVENTOR.
AGIS I. MIHALAKIS
BY
Bean, Brooks, Buckley & Bean
ATTORNEYS

United States Patent Office
2,738,491
Patented Mar. 13, 1956

1

2,738,491

PROJECTED WARNING SIGNAL DEVICE FOR AIRPLANES

Agis I. Mihalakis, Buffalo, N. Y., assignor to Glowmeter Corporation, Buffalo, N. Y.

Application November 14, 1951, Serial No. 256,337

9 Claims. (Cl. 340—27)

This invention relates generally to the field of instrumentation, and, more particularly to a new and useful warning instrument adapted for use on aircraft as well as other vehicles, and this application is a continuation-in-part of applicant's copending application Ser. No. 210,731, filed February 13, 1951.

The advent and development of the airplane has created many new problems in the field of instrumentation, as well as accentuated many old ones. One source of difficulty lies in the fact that, in an airplane, safe operation during a particular maneuver requires not only that the engine be functioning properly, but also that certain component parts of the airplane assume a predetermined position. For example, in an aircraft utilizing a retractable landing gear, a safe landing operation requires that the landing gear be lowered and locked in down position. However, pilots periodically forget to lower their landing gear, and thus there arises the problem of warning the pilot of the existence of this dangerous situation. Also, in the case of carrier-based aircraft, wherein a retractable hook extending beneath the airplane is caught by a guy-line on the flight deck, the pilot is at times so occupied with other considerations that he forgets to lower the said hook, and some means must be found to warn him when such is the case. In addition, it is important that wing flaps be properly adjusted for landing and take-off operations. Here again, it is not uncommon for a pilot to momentarily overlook this detail, and it is highly desirable to provide some means for warning the pilot to check his flaps and adjust them when necessary.

These examples could be extended to cover virtually every essential movable component of an airplane, but the basic problem remains the same; a means must be provided to give clear and unmistakable warning whenever an essential movable part of the airplane is not in the predetermined correct position for a particular maneuver. This problem is rendered even more difficult by the fact that a pilot must continually survey and digest the intelligence being conveyed to him by a myriad of instruments, and is thus unable to study and reflect upon any one particular instrument or indicator.

So also, there is the problem of providing a clear and unmistakable warning whenever the oxygen or fuel supply is low, or some other such unsafe condition exists.

Prior art warning instruments and indicators have in general proven to be very unsatisfactory. Quite often they have been placed on the instrument panel itself where they are surrounded by other instruments and fail to attract attention unless actually studied. Sometimes they have taken the form of mechanical devices with a movable member adapted to change position, which devices are not of a nature to unfailingly attract attention. The use of sound generating devices has also been proposed, but they are unnecessarily distracting and irritating, and obviously must be severely limited in number. Other prior art warning devices possess the disadvantage of being too bulky, or too expensive, and some, relying upon an illuminated signal, are visible practically only in darkness.

Accordingly, it is an object of this invention to provide a warning indicator which will invariably and immediately attract attention to the existence of an unsafe condition.

It is another object of this invention to provide a warning system which can be used to indicate the existence of almost any unsafe condition, and is thus of substantially universal adaptability.

An additional object of this invention is to provide a warning indicator which does not require scrutiny thereof to realize the existence and nature of the unsafe condition.

A further object of this invention is to provide a warning instrument which will begin operating immediately upon the creation of a predetermined unsafe condition, and will continue in operation until said unsafe condition has been corrected.

It is also an object of this invention to provide a warning instrument which will project a flashing color signal within the normal range of vision of the operator of the vehicle, which signal can be regulated in intensity and is clearly visible in daylight as well as in darkness.

Another object of this invention is to provide a warning instrument which can easily be combined with means indicating the position of a particular member.

Also, it is an object of this invention to provide a warning instrument as aforesaid and which includes a source of illumination with means for testing the same.

In addition, an object of this invention is to provide a warning instrument of the aforementioned type which is relatively inexpensive to manufacture, simple in construction, compact, and entirely reliable in operation.

The foregoing and other objects will become apparent upon a perusal of the ensuing detailed description, taken together with the accompanying drawing, wherein:

Fig. 1 is a view of the cockpit of an airplane showing the warning instrument of the present invention installed therein, with certain parts in section and certain parts broken away for convenience of illustration;

Fig. 2 is a detail view of the warning instrument of the present invention, with parts in section for greater clarity;

Fig. 3 is a plan view of the windshield showing the location of the viewing means;

Fig. 4 is a detail sectional view of a modified warning instrument incorporating indicating means therein;

Fig. 5 is a view taken along the line V—V of Fig. 4;

Fig. 6 is a view of the image or warning signal which is intermittently projected into the range of vision of the pilot by the warning instrument of Fig. 2;

Fig. 7 is a view of a different image or signal which can be similarly projected by the warning instrument of the present invention;

Fig. 8 is a view of the image projected by the warning indicator of Fig. 4;

Figure 10:
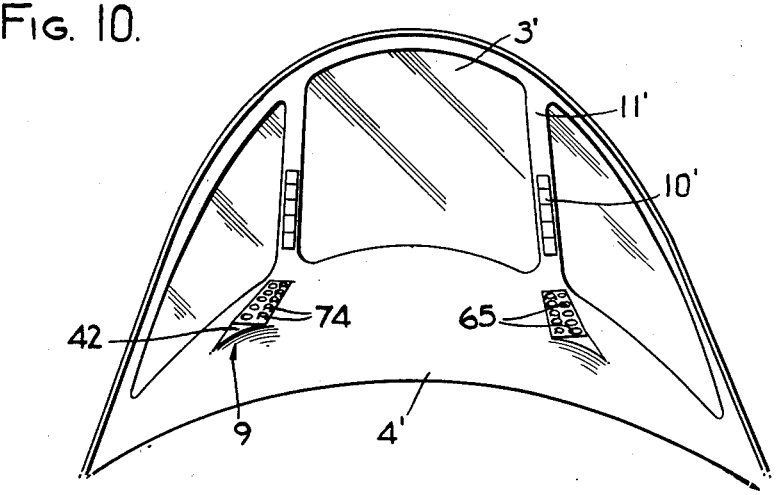
Fig. 10 is a view similar to Fig. 3 showing an arrangement of a plurality of warning instruments.

It is to be understood at the outset that while the present invention is disclosed as applied to an airplane, it is equally well adapted for use on other types of vehicles as well as in stationary installations.

There is shown in Fig. 1 of the drawing the cockpit of an airplane 1, which cockpit is enclosed by a canopy 2 and windshield 3. An instrument panel 4 in located in the forward part of the cockpit, and in front of said panel is a firewall 5, forward of which is the motor compartment containing an engine block 6 with its accompanying intake manifold 7. A retractable landing gear 8 extends beneath aircraft 1.

The warning instrument of the present invention is shown generally at 9 as being located on panel 4, and projects a flashing image or warning signal onto a screen 10 which is located on part of the molding 11 around windshield 3, as shown more clearly in Fig. 3.

The warning instrument itself, as shown in Fig. 2, comprises a tubular casing 12 which is secured by means of a bracket 13 to panel 4. The lower end of tubular casing 12 is threaded, as at 14, and an enlarged housing 15 is threadedly engaged thereon. A tubular member 16 fits within tubular casing 12, and is appropriately notched or grooved to receive and hold in place an objective lens 17, a transparency 18, a masking member 19 containing an aperture 20, and a condenser lens 21. A source of illumination 22 is contained within housing 15, and this source of illumination is energized from a power source 23 to which it is connected through a blinker relay 24 and a switch 25 which is closed by retarding the throttle 26 of airplane 1. Also included within this energizing circuit is a downlock switch 27 which is arranged to be closed whenever landing gear 8 is retracted, and opened when landing gear 8 is locked in down position. Power source 23 is appropriately grounded as at 28, and the source of illumination 22 is grounded at 29.

Transparency 18 has appropriate indicia 30 thereon, such as the word "wheels" and an arrow pointing downwardly, as shown in Fig. 6, whereby to indicate not only the existence of the unsafe condition, but also its nature and the necessary correction. Of course, any other indicia appropriate to the intelligence which it is desired to convey could equally well be used. Preferably, transparency 18 is colored, whereby the projected image will be colored to more readily attract attention, and it has been found that certain shades of red are particularly adapted to this purpose. Of course, if desired, the transparency can be made with opaque indicia on a clear background or clear indicia on an opaque background and a separate color filter could be used.

Mask 19 is used to create a sharply defined border around the image, whereby a clear line of demarcation between the image and surrounding matter will be maintained. Condenser lens 21 collects the light rays from the source of illumination 22, and focuses them into a beam passing through aperture 20 and transparency 18, thereby intensely illuminating the indicia on said transparency. An image of the illuminated transparency is projected by objective lens 17 onto screen 10, said objective lens serving to focus the image on said screen. Obviously, tubular member 16 can be adjusted within tubular casing 12 to provide a clear image on screen 10.

Screen 10 is peculiarly adapted to the instant purpose, in that it is of the type disclosed in copending application Serial No. 162,851 for a Reflecting Screen, filed May 19, 1950, by Agis I. Mihalakis. This screen comprises a furrowed surface which has been subjected to a plating process, and is adapted to present a brilliant image even in broad daylight. Since screen 10 is located on molding 11 and is thus adjacent windshield 3, it is well within the pilot's normal range of vision whereby the reflected image will attract his attention even though he is not consciously watching the screen.

The operation of this warning indicator is as follows. Whenever landing gear 8 is in any position but locked down position, switch 27 will be closed. Then, if the pilot should retard throttle 26 to reduce the speed of airplane 1 below a predetermined minimum for any reason, as when preparing to land, switch 25 will close, thus completing the energizing circuit between power source 23 and light source 22 and illuminating light source 22. Blinker relay 24 serves to periodically interrupt this circuit, thus causing intermittent flashing of light source 22. Light source 22 will cooperate with transparency 18, in the manner previously described, to create the image shown in Fig. 6, and this image will be projected onto screen 10. By reason of the location of the screen, the intermittent flashing of the signal, and the color of the signal, the pilot's attention will immediately be attracted thereto, and he will be warned that he has retarded his throttle and that the landing gear is not in down-lock position. If he intends to land, he will thereupon be reminded to lower his landing gear, and the flashing warning will continue until landing gear 8 has become locked in down position, at which time switch 27 will open, or until throttle 26 has been accelerated to open switch 25, thus opening the power circuit to light source 22. This intelligence will be conveyed to the pilot immediately and unfailingly, and without requiring his scrutiny of the indicator. A manually operable rheostat 31 is included within the energizing circuit to light source 22, whereby the intensity of the projected image can be regulated.

Of course, this indicator can be used to give warning of virtually any other dangerous condition. Thus, in aircraft having a retractable hook designed to be caught by a guy rope, by merely changing the indicia on transparency 18 to that shown in Fig. 7 at 30', and by arranging switch 27 to be operated by the hook mechanism, not illustrated, the instrument will operate in the manner previously described to warn the pilot, upon retarding the throttle and accordingly reducing the speed of the aircraft below a predetermined minimum, when his landing hook is not in down-lock position. When the hook is properly lowered and locked in down position, the energizing circuit to light source 22 will open and the warning will cease flashing.

A further example of the adaptability of the warning indicator of the present invention is illustrated in Figs. 4, 5 and 8. In this modification, the warning indicator is adapted to warn a pilot to check, and if necessary adjust, his flaps whenever the speed of the aircraft is below a predetermined minimum. The problem overcome by this modification differs from those previously considered, because the wing flaps do not necessarily assume the same, identical position during landing and take-off operations, and a variable factor is thus introduced. Sometimes the flaps should be only partly lowered, while at other times they should be completely lowered, the particular position being dependent on wind velocity and direction, the load being carried, the length of the runway, and other factors. To provide for this variable factor, the warning indicator is adapted to project an appropriate warning signal wherever the speed of the aircraft is below a predetermined minimum and to continue projecting a warning signal either until the speed rises above said predetermined minimum, or until the aircraft engine is at idling speed. Whenever the speed of the plane is above idling speed but below said predetermined minimum, the pilot will be warned to check, and if necessary adjust, the flaps.

This modified warning indicator comprises a tubular casing 12, a housing 15 threadedly engaging with said casing at 14, a tubular member 16 contained within said casing, a colored transparency 18 having appropriate indicia 30" thereon, a mask 19 having an aperture 20 therein, and a light source 22 connected to be energized from a power source 23 through a blinker 24, all as previously described in connection with Fig. 2. A switch 25' is adapted to close the energizing circuit of light source 22 under the influence of the pressure in intake manifold 7, which manifold pressure varies with the speed of aircraft 1. The arrangement is such that whenever the speed of aircraft 1 is below a predetermined minimum, switch 25' will be closed to intermittently energize light source 22, whereupon a flashing colored image of the word "flaps" will be projected onto screen 10. A second switch 27', normally closed, is adapted to open the energizing circuit of light source 22 whenever engine 6 is at idling speed. Thus, switch 27' could be operated either by the pressure in manifold 7, or by throttle 26. However, if desired this last-named switch may be dispensed with, energizing and deenergizing of light source 22 being accomplished solely through switch 25'.

In addition to projecting a warning image, the warning instrument of the instant modification is adapted to project an indication of the position of the flaps. This is deemed particularly desirable since the position of the flaps varies under the influence of numerous external factors, and because quite frequently it is impossible for the pilot to see the flaps, as when flying blind, or when split-type flaps are used, and is accomplished in the following manner.

A transparent, segment-shaped member 32, bearing indicia 33 in the outline of a flap thereon, is pivotally mounted to extend through an aperture 34 in casing 12 and member 16. A transmitter 35 is located at a flap 36 of aircraft 1 so as to be controlled thereby, and is electrically connected to energize a receiver 37, which receiver is operatively connected to and pivotally supports segment-shaped member 32 by means of a shaft 38. Transmitter 35 can be any conventional means for transmitting the movement of a member on a reduced scale, such as a selsyn motor or a magnesyn type transmitter or the like, and is adapted to transmit a signal which varies with the position of a flap 36. Receiver 37 is adapted to move shaft 38 and consequently member 32 in accordance with the signal received from transmitter 35.

Indicia 30" includes appropriate markings such as "up," "½," and "down," and the arrangement is such that member 32 will cause flap silhouette 33 to move therebetween whereby the projected image will indicate the position of flap 36 as well as warn the pilot to check the flaps. In operation, whenever the speed of the aircraft is below a predetermined minimum but above idling speed, a flashing, colored image will be projected onto screen 10 as shown in Fig. 8, which image will instantly warn the pilot to check his flaps and make any necessary adjustments. In addition, the position of flap 36 will be clearly indicated by the imaged position of indicia 33. This warning will persist either until the speed of the aircraft rises above said predetermined minimum, or until engine 6 is at idling speed.

As will be seen from the drawing, transmitter 35 and receiver 37 are energized from power source 23, and this circuit can remain closed continuously, or switch 25' can be connected therein. Also, if desired, the energizing circuit to light source 22 can be arranged so that blinker 24 will be by-passed or remain closed whenever the flap control handle 39 is moved from "up" position. For this purpose, a short-circuit including a switch 40 can be arranged across blinker 24, with switch 40 adapted to be closed whenever flap control handle 39 is moved from "up" position. With such an arrangement, a flashing image will be projected first when the speed of the aircraft 1 is below a predetermined minimum and above idling speed; the flashing will cease and the image will be steadily projected while the flap control handle is being actuated; and all image projection will cease when engine 6 is operating at idling speed or above said predetermined minimum speed. In addition, rheostat 31 may be included in this energizing circuit to regulate the intensity of the projected image, if such is desired. Also, switch 27' can be arranged to open at any desired speed.

Switches 25 and 25' can be actuated by any means which vary with speed. Thus, they can be connected to the manifold pressure control solenoid which actuates the conventional retarded throttle warning horn, or to the throttle itself. In installations wherein the dangerous condition is not dependent upon speed, they can be connected in any appropriate circuit. Also, it will be appreciated that switches 27' and 40 can be connected in any desired manner. Thus, switch 27' can be actuated by flap 36 assuming a particular position, and switch 40 can be actuated either by flap 36 or by flap control handle 39, or by other means. In addition, it should be noted that switches 25, 25', 27, 27' and 40 are conventional switches, the details of which form no part of the present invention.

Figure 9:
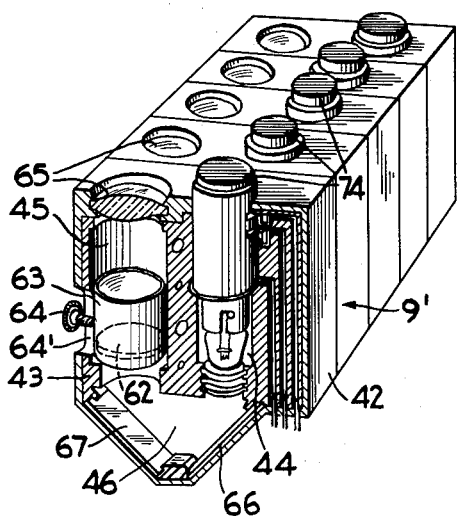
Fig. 9 is a view of a slightly modified construction of the warning instrument of the present invention, and showing a testing arrangement incorporated therein.

A modified construction 9' of the warning instrument of the instant invention is illustrated in Fig. 9, wherein there is shown a group of instruments of such modified construction. As shown in Fig. 9, this modified construction comprises a casing 42 enclosing a body member 43 preferably formed of a molded plastic material having electrical insulating properties. Body member 43 is provided with spaced bores 44 and 45, and casing 42 is appropriately shaped to provide a passage 46 connecting said bores at their lower ends.

Condensing lens means 47 are mounted in said body member adjacent the lower end of bore 44, and an indicia-bearing light pervious member 48, which member corresponds to member 18 in Fig. 2 and is preferably transparent, is carried by said body member adjacent said condensing lens means. A source of illumination 49 is mounted in a socket 50 which is carried in a shell 51 formed of plastic or other electrical insulating material, and shell 51 is removably mounted in bore 44 by means of an ear 52 carried by said shell and cooperating with a slot 53 in said bore, all as clearly shown in Fig. 11. Thus, shell 51 is mounted in bore 44 with light source 49 operatively alined with condensing lens means 47 and member 48.

Socket 50 is spring loaded by spring 54 in a conventional manner, and includes a contact disc 55 connecting to the base contact of light source 49 by a conductor 56. Contact disc 55 is provided with a wiping contact 57 extending through shell 51, and contact 57 bears against a wiping contact 58 which is bent as illustrated to provide a spring action and which is connected to lead wire 59 leading to the warning signal energizing circuit as illustrated in Fig. 2. A ring type electrical connector 60 carried by a groove in body member 43 contacts socket 50, and connects to lead wire 61 which is grounded. Thus, as previously described in connection with Figs. 2 and 4, upon the occurrence or existence of a predetermined undesirable condition, light source 49 is energized, preferably intermittently, to illuminate member 48.

An objective lens means 62 is carried by a sleeve 63 adjustably mounted in bore 45 by means of an adjusting screw 64 extending through a slot 64' in said casing and body member, and a transparent cover member 65 encloses the outer end of bore 45 to preclude the entrance of dust and the like thereinto.

As is seen in Fig. 10, and similarly to Fig. 3, a plurality of viewing screen means 10' are arranged along the molding or frame 11' of windshield 3', and the bore 45 of each of said instruments 9' is alined with one of said screen means. Also, reflecting surfaces 66 and 67 are provided in passage 46 of each of said instruments to reflect an image of the illuminated indicia-bearing member 48 through objective lens means 62 which latter is adjusted to focus and project said image onto one of screen means 10'. Reflecting surfaces 66 and 67 are carried by casing 42 and arranged relative to each other and to said indicia-bearing member and said objective lens means in accordance with well known laws of optics relating to angles of incidence and reflection to accomplish the above result. Thus, whenever the predetermined undesirable or unsafe condition occurs or exists, as previously described, a flashing warning image will be projected onto one of screen means 10' where, by reason of the adjacency of said screen means to the vehicle operator's normal field of vision through said windshield or window, it will immediately attract the attention of the vehicle operator and warn him of the existence and nature of such unsafe condition. Obviously, said image may be colored and may comprise any desired indicia, all as previously indicated and described.

Fig. 10 shows two sets or groups of warning instruments of the type illustrated in Fig. 9 arranged in the cockpit of an airplane, with said instruments being carried by the instrument panel 4' underlying the rearwardly sloping windshield or viewing window 3'. The casings of said instruments are preferably carried within instrument panel 4', with the upper end thereof exposed, and the various screen means 10' are arranged along the molding 11' of window 3' to overhang the bores 45 of said instruments. In this manner, a plurality of instruments, ten being illustrated, can be utilized and the viewing screen means therefor can be arranged adjacent the viewing window to present a minimum of interference, if any, to vision therethrough while at the same time immediately attracting the attention of the vehicle operator upon a warning image being projected thereon. Also, with the warning images being projected upwardly through the instrument panel and onto the overhanging screen means which are inclined toward the vehicle operator, any interference from extraneous or undesired light is reduced noticeably, whereby the projected warning image will be clearly visible in daylight as well as in darkness. The use of applicant's previously referred to specific screen surface further reduces such interference from extraneous light.

Figure 11:
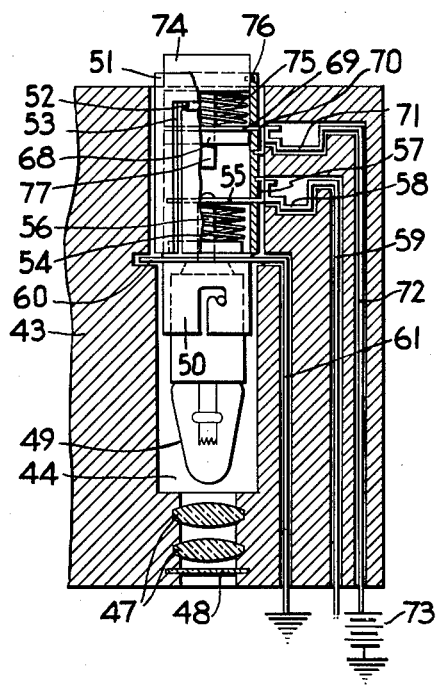
Fig. 11 is a detail view of the bulb testing arrangement of the present invention.

A further advantage of the instant invention lies in the provision of a manually controlled means for selectively energizing said light source to test the same. Thus, as illustrated in Fig. 11, shell 51 contains an insulating disc 68 fixed therein and a conductor washer 69 having a wiping contact 70 extending through said shell. Contact 70 bears against a wiping contact 71 which is bent to provide a spring action and is carried by body member 43. Contact 71 is connected to a lead wire 72 which is in turn connected to a source of electric potential such as battery 73.

A manually actuatable push button 74 is carried in the outer end of sleeve 51, being biased outwardly therefrom by spring 75 and being held therein by a pin or ear 76. Push button 74 is provided with an elongate contact member 77 adapted to bridge contact disc 55 and conductor 69 when push button 74 is pushed inwardly against the action of spring 75, thereby energizing light source 49 to test the same independently of lead wire 59 leading to the warning signal energizing circuit. Since push button 74 and light source 49 are carried as a unit in sleeve 51, which latter is removably mounted in bore 44, this entire unit is readily insertable in place in bore 44 to facilitate assembly and disassembly of the warning instrument.

In this way, the light source of each of the warning instruments can be tested at will, as, for example, prior to operation of the vehicle, such testing arrangement being a highly desirable and important safety feature. Obviously, this testing arrangement can also be used with the warning instrument construction illustrated in Figs. 2 and 4.

When all of the disclosed warning instruments are used, the screens 10 are mounted in vertical relation on molding 11, where they occupy but little room, and where images projected thereon will immediately attract the attention of the pilot. These warning instruments project a colored, flashing image which not only immediately attracts attention, but also gives warning of the nature of the unsafe condition without requiring close scrutiny. The projected images are clearly visible in daylight as well as in darkness, and the instruments are compact and relatively inexpensive to manufacture. Thus, it is apparent that the present invention fully accomplishes its aforesaid purposes, and is far superior to the warning indicators of the prior art. It is also apparent that this invention is not limited to the particular installations specifically disclosed, but is susceptible of many modifications and a wide range of uses and adaptations, and is to be limited only by the scope of the appended claims.

Having fully disclosed the instant invention, and having completely described its mode of operation, what is claimed as new is as follows:

1. In a vehicle having a viewing window, a warning instrument comprising a housing, an indicia-bearing member carried within said housing, a source of illumination within said housing arranged to illuminate said indicia-bearing member, electric circuit means responsive to the existence of a predetermined condition for energizing said source of illumination, viewing screen means arranged exteriorly of said housing adjacent the vehicle operator's field of vision through said window, objective lens means carried within said housing in operative alignment with said source of illumination and said indicia-bearing member and focusing the indicia on said screen means, whereby an image of said illuminated indicia-bearing member will be projected onto said screen means, and means including a manually operable control member for selectively energizing said source of illumination, said source of illumination and said control member being arranged in a unit detachably mounted in said housing.

2. In a vehicle having a viewing window and an apertured instrument panel extending laterally therebeneath, viewing screen means arranged adjacent the normal field of vision of the vehicle operator through said window, a warning instrument carried behind said instrument panel and comprising an indicia-bearing member, a source of illumination arranged to illuminate the indicia on said indicia-bearing member, means including electric circuit means arranged for intermittently energizing said source of illumination during the existence of a predetermined condition, and means including objective lens means interposed between said indicia-bearing member and said viewing screen means and focusing the indicia on the latter for projecting an image of the illuminated indicia through the aperture and onto said viewing screen means, whereby a flashing warning image will be projected onto said viewing screen means to give warning of the existence of said predetermined condition.

3. A warning instrument arrangement as defined in claim 2, wherein said objective lens means are adjustable to permit proper focusing of said indicia image on said viewing screen means.

4. A warning instrument arrangement as defined in claim 2, wherein said viewing screen means is opaque with a reflecting surface comprising a multiplicity of fine grooves and ridges coated with a highly light-reflecting material.

5. In a vehicle having a viewing window and an apertured instrument panel extending laterally therebeneath, opaque viewing screen means arranged adjacent the normal field of vision of the vehicle operator through said window and having a highly light-reflecting surface, a warning instrument carried within said instrument panel and comprising a light-transmitting indicia-bearing member, a source of illumination arranged to illuminate the indicia on said indicia-bearing member, means including electric circuit means arranged for intermittently energizing said source of illumination during the existence of a predetermined condition, and means including objective lens means interposed between said indicia-bearing member and said viewing screen means and focusing the indicia on the latter for projecting an image of the illuminated indicia onto said viewing screen means.

6. A warning instrument as set forth in claim 5, together with means coloring the projected indicia image.

7. In a vehicle having an inclined window provided with upright support molding and an apertured instrument panel extending laterally therebeneath, a warning instrument system comprising opaque screen means having a highly light-reflective surface arranged along said support molding, and image-producing instrument means within said instrument panel including illuminating means intermittently energized upon the existence of a predetermined condition for projecting a flashing indicia image onto said viewing screen means to give warning of the existence of said predetermined condition.

8. In a vehicle having a viewing window and an instrument panel adjacent thereto, viewing screen means arranged adjacent the field of vision of the vehicle operator through said window, a warning instrument system comprising a housing mounted in said instrument panel, said housing having a substantially U-shaped internal passage, a projection system including a light-transmitting indicia-bearing member within said passage, a source of illumination arranged within one leg of said passage to illuminate said indicia-bearing member, objective lens means within the other leg of said passage and focusing the indicia on said screen means, means including a reflecting surface within said passage arranged to operatively align said projection system, and electric circuit means intermittently energizing said source of illumination during the existence of a predetermined condition, whereby a flashing warning image will be projected onto said viewing screen means to give warning of the existence of said predetermined condition.

9. A warning instrument as set forth in claim 7, wherein said screen means reflecting surface is inclined toward the vehicle operator and over said instrument panel, and wherein said surface is provided with a multiplicity of fine vertically extending grooves and ridges.

References Cited in the file of this patent

UNITED STATES PATENTS

| | | |
|---|---|---|
| 1,871,877 | Buckman | Aug. 16, 1932 |
| 2,178,637 | Link, Jr. | Nov. 7, 1939 |
| 2,262,756 | Clexton | Nov. 18, 1941 |
| 2,292,392 | Miller | Aug. 11, 1942 |
| 2,424,573 | Marco | July 29, 1947 |
| 2,450,450 | Schmidinger | Oct. 5, 1948 |